United States Patent [19]

Henson

[11] 3,910,234
[45] Oct. 7, 1975

[54] QUICK-RELEASE DOG LEASH
[75] Inventor: Edward V. Henson, East Baton Rouge, La.
[73] Assignees: David L. Ray, Baton Rouge; Lyman K. Anselmo, Greenwell Springs, both of La.
[22] Filed: Mar. 28, 1974
[21] Appl. No.: 455,578

[52] U.S. Cl. .............................. 119/111; 119/114
[51] Int. Cl. ........................................ A01k 27/00
[58] Field of Search .................. 119/114, 109–111, 119/106

[56] References Cited
UNITED STATES PATENTS
731,770   6/1903   Graybill ............................. 119/114
759,287   5/1904   Kettle ................................ 119/114
937,800   10/1909  Hazzard ............................. 119/114

FOREIGN PATENTS OR APPLICATIONS
761,099    1/1934   France ............................. 119/106
1,029,721  6/1953   France ............................. 119/114

Primary Examiner—Louis G. Mancene
Assistant Examiner—J. N. Eskovitz
Attorney, Agent, or Firm—David L. Ray

[57] ABSTRACT

A quick-release dog leash or tether having means remote from the tethered dog for quickly releasing the dog from the tether.

5 Claims, 5 Drawing Figures

QUICK-RELEASE DOG LEASH

BACKGROUND OF THE INVENTION

Hand-held tethers or leashes are commonly employed to control dogs in training and to keep them from running astray. Dogs are commonly placed on a leash or tether and held when the owner or trainer is transporting them from one location to another. The owner or trainer of a dog or other animal frequently desires to release the animal from the leash as quickly and easily as possible. Patrolmen and military personnel in particular using police patrol dogs need to release the animal quickly to pursue or attack a dangerous criminal or the enemy. Hunters also frequently need to release dogs on leashes quickly to pursue a fleeing animal or to retrieve game that has been wounded.

It is often quite difficult to release a tethered dog quickly, especially when the animal has sighted game or some other object which it is about to pursue, because the animal becomes excited and pulls tightly on the leash in an attempt to begin pursuit. Such an excited animal will twist, turn, jump and pull against the leash thereby making it extremely difficult to detach the leash from the animal. It is therefore highly desirable to provide an animal tether or leash from which an excited animal may be quickly and easily released.

U.S. Pat. Nos. 2,776,644; 937,800; 759,287; 731,770, and 296,764 disclose various types of animal tethers, but none of these patents disclose an easily and quickly releasable handheld dog tether.

THE INVENTION

The invention of the present application is a dog tethering device including finger actuated means for releasing the dog from the tether. The invention will be more easily understood by referring to the attached drawing in which.

Figure 1:
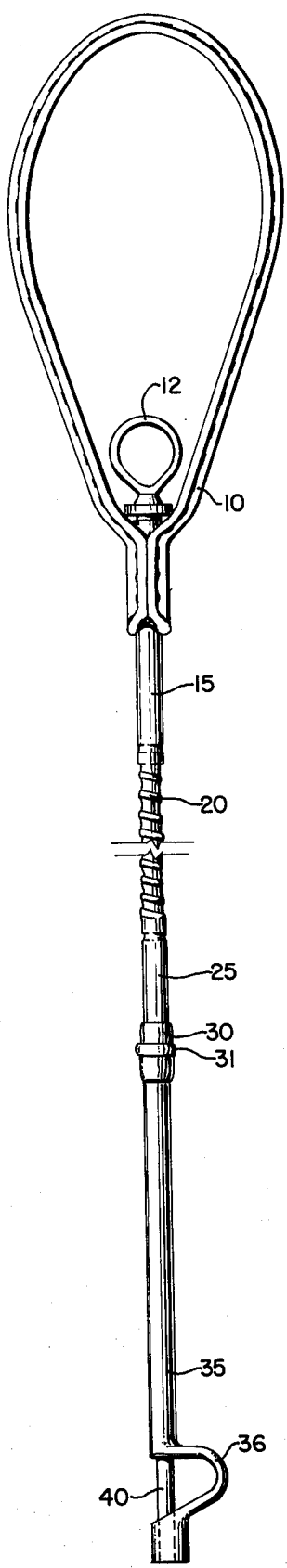
FIG. 1 is an elevated view of the dog tether of the present invention.

Referring now to the drawings, a completely assembled dog tether is shown in FIG. 1. The tether includes a hand strap 10 attached to an upper housing 15 which is attached to a middle housing 20. Middle housing 20 may be made from a rigid tube or pipe particularly when the tether is relatively short, or it may be flexible as depicted in the drawings. Middle housing 20 is connected at its lower end to lower housing 25. Lower housing 25 is secured to bolt housing 35 by means of a rotatable coupling 30. Housing 25 may be rigidly connected to bolt housing 35, but rotatable coupling 30 is preferred when used on a dog which twists or turns while leashed. At the upper end of the tether is finger release eye 12 which actuates bolt 40 on the lower end of the tether shown in FIG. 1.

Figure 3:
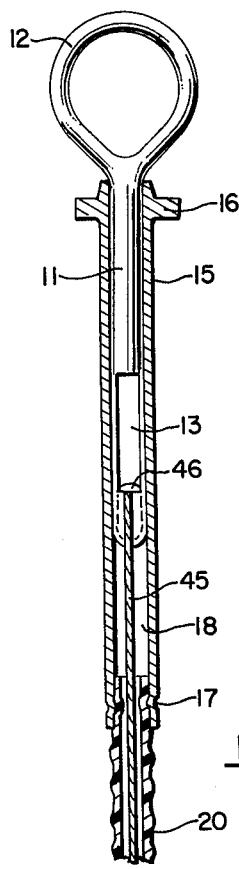
FIG. 3 is a partly sectional view of the upper portion of the dog tether.

In FIG. 3 of the drawings is shown the upper end of the dog tether with the hand strap 10 removed. Upper housing 15 can be seen to have a hollow, cylindrical interior 18 and a circular lip 16 on the upper portion thereof. The lower end of upper housing 15 is attached to the upper end of middle housing 20 by means of an indention, or crimp 17. However, any other suitable means may be used for joining upper housing 15 to flexible housing 20. Finger release bolt 11 is shown inserted into the hollow interior 18 of upper housing 15. Finger release bolt 11 has an eye or ring 12 at the top thereof for receipt of the finger of the person using the release. Finger release bolt 11 is of suitable cross-sectional diameter to slide easily within upper housing 15 when finger release bolt 11 is pulled upward by the finger of the operator inserted in ring 12.

Figure 4:
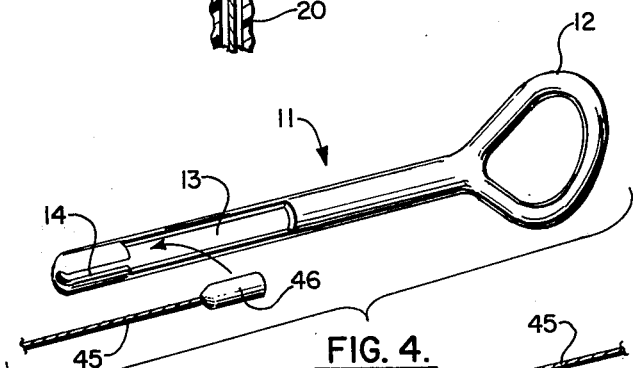
FIG. 4 is a perspective view of the upper finger release mechanism of the dog tether.

Attached to the lower end of finger release bolt 11 is cylindrical lug 46 having attached thereto release cable 45, as can be seen in FIG. 3 and FIG. 4. The cylindrical lug 46 fits into the interior 13 of finger release bolt 11. Release cable 45 slides into groove 14 of finger release bolt 11. Release cable 45 is shown in the operating position in the interior of upper housing 15 and middle housing 20 in FIG. 3. Cylindrical lug 46 is of suitable cross-sectional diameter to slide snugly into the interior of the hollow portion 13 of finger release bolt 11. It is important that cylindrical lug 46 and the interior of finger release bolt 11 be of circular crosssection so that cylindrical lug 46 will rotate within chamber 13 when bolt housing 35 is rotated. Although cylindrical lug 46 is preferred, cable 45 may be rigidly or rotatably attached to release bolt 11 by any suitable means known in the art, particularly when middle housing 20 is made from a rigid pipe or tube.

Figure 2:
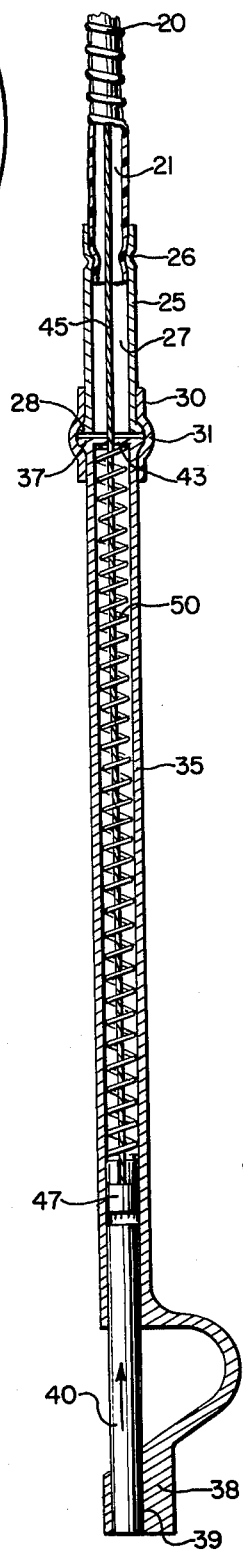
FIG. 2 is a partly sectional view of the lower portion of the dog tether.

The lower portion of the dog tether of the present invention is shown in FIG. 2. Middle housing 20 is connected to lower housing 25 in the same manner as middle housing 20 is connected to upper housing 15, i.e., by crimp 26, or other suitable means well known in the art. Lower housing 25 is a generally hollow, rigid member of circular cross-section having lip 28 extended circumferentially around the outside of the housing. The lip 28 is held along with lip 37 of bolt housing 35 in the interior of rotatable coupling 30, as indicated in FIG. 2. Rotatable coupling 30 has a raised portion 31 in the approximate middle of the coupling which receives lips 28 and 37 to connect the lower housing 25 to bolt housing 35. Coupling 30 permits lower housing 25 to rotate relative to bolt housing 35. Rotatable coupling 30 may be rigidly attached to either lower housing 25 or bolt housing 35, or rotatable coupling 30 may not be attached to either so long as lower housing 25 and bolt housing 35 are permitted to rotate relative to each other. The relative rotation of lower housing 25 and bolt housing 35 prevents the dog tether from twisting and possibly breaking should the dog being held by the tether twist and turn. If a rigid tether is desired, lower housing 25, middle housing 20, and upper housing 15 may be made from one solid tube or cylinder.

Figure 5:
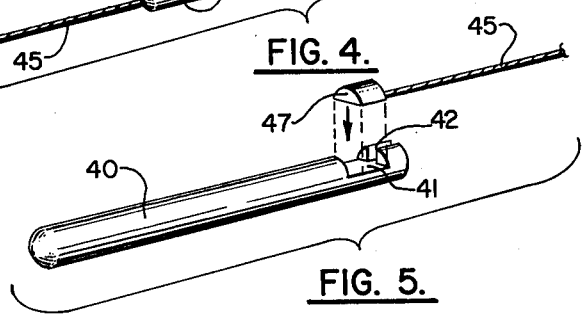
FIG. 5 is a perspective view of the lower portion of the finger release mechanism.

Bolt housing 35 can be seen in FIG. 2 to be a generally hollow cylinder having an eye 36 on the lower end for receipt of a collar or chain (not shown) which is tied around the neck of the dog. The extreme lower end 38 of the bolt housing 35 also has a hollow portion 39 in alignment and of the same diameter with the circular hollow portion of the upper part of bolt housing 35. A set screw (not shown) may be inserted in the lower end of hollow portion 39 to prevent connecting bolt 40 from falling out should cable 45 break. The interior of the upper portion of bolt housing 35 has a spring 50 inserted therein. The upper end of the spring is held within bolt housing 35 by an interior lip 43 which extends into the interior of bolt housing 35. The upper end of spring 50 butts against lip 43. The lower end of spring 50 butts against connecting bolt 40 which is shown in FIGS. 1, 2, and 5. Connecting bolt 40 has a slot 41, as indicated in FIG. 5, and a groove 42 for receipt of lug 47. Release cable 45 is attached to the lug 47. Release cable 45 fits into groove 42 when lug 47 is inserted into slot 41 of connecting bolt 40. As can be seen in FIG. 2, bolt 40 fits into the interior of bolt housing 35. Connecting bolt 40 is of sufficient cross-sectional diameter to slide easily within bolt housing 35.

To attach the present invention to a dog wearing a collar or chain around its neck, the hand of the operator is placed within hand strap 10 and the forefinger of the hand is inserted into ring 12. Ring 12 is then pulled upward and finger release bolt 11, in turn, pulls cable 45 upwardly. Cable 45, in turn, pulls connecting bolt 40 upwardly until the lower end of connecting bolt 40 is completely withdrawn into the upper portion of bolt housing 35 above bolt housing eye 36. The collar of the dog is then placed in eye 36. The operator removes his finger from ring 12 thereby allowing spring 50 to force connecting bolt 40 downward into the hollow portion 39 of bolt housing 35. The collar of the dog is then securely held between connecting bolt 40 and eye 36, and the dog is now attached to the tether. It is well known in the art that many dog collars and chains have a small, circular ring attached thereto. When such a collar is employed, the ring is placed between eye 36 and bolt 40.

The hand strap 10 of the dog tether of the present invention is sufficiently wide or at least as wide as the diameter of ring 12 and of sufficient length so that the operator may place his hand through strap 10 and grasp the portion of the strap of ring 12 with the fingers of his hand, the upper portion of the strap resting on the operator's wrist. When the hand strap is grasped in this manner ring 12 cannot be accidently pulled upward resulting in an accidental release of the tethered dog. The tethered dog is released by merely pulling upward on ring 12 with the finger of the hand which is holding strap 10. The dog may be easily and quickly released by the finger of the same hand which holds the leash, thereby leaving one hand of the operator free. The hand strap 10 is made of any suitable flexible material such as leather, plastic, fabric, or the like, and preferably has a small spring or other flexible means in the center thereof to retain the strap in a generally circular configuration for easy insertion of the hand of the operator.

In another embodiment of the present invention (not shown) one end of a dog collar may be welded or attached by any other suitable means to bolt housing 35, preferably in the area of the lower portion 38 of housing 35. The other end of the collar could then be wrapped around the neck of the dog and attached to eye 36 and connecting bolt 40, as previously explained.

In still another embodiment, the tether could have one upper end or handle and multiple lower ends for attaching to more than one dog. The tether of the present invention could also conceivably be used to tether inanimate objects, such as a boat to a dock, for example.

It is believed that the invention has been sufficiently explained without any further details so as to enable those skilled in the art to understand the complete operation thereof. It is desirable to point out suitable variation is capable of being made without in any way departing from the spirit of the scope of the invention as defined in the claims appended hereinafter.

What is claimed is:

1. A quick-release dog tether comprising:
    a. hand strap means;
    b. hollow housing means having a first end and a second end, said first end being connected to said hand strap means;
    c. eye means attached to said second end of said housing means for receipt of an animal collar;
    d. slideable connecting bolt means located in said second end of said housing means adjacent to said eye means for holding said collar in said eye means;
    e. cable means located within said housing means attached at one end to said bolt means and at the other end to releasing means located on said first end of said housing means,
        i. said releasing means being adapted to slide said bolt means in said housing means,
        ii. said releasing means comprising a releasing bolt having a ring on a first end thereof and said cable means attached to a second end thereof, said releasing bolt being located in said housing and said ring projecting from said first end of said housing means;
    f. spring means in said housing means coiled around said cable means, one end of said spring means resting against said connecting bolt means, and
    g. means for permitting said eye means to rotate relative to said hand strap means.

2. The tether of claim 1 wherein said ring is located within said hand strap means.

3. The tether of claim 1 wherein said hand strap means has a spring therein for maintaining said hand strap means in a generally circular configuration.

4. The tether of claim 1 wherein said housing means is flexible.

5. The tether of claim 1 wherein said housing means is rigid.

* * * * *